3,197,522
PROCESS FOR ALKYLATING AROMATICS
Harold L. Dimond and Arthur C. Whitaker, Pittsburgh, Pa., assignors to Gulf Research & Development Company, Pittsburgh, Pa., a corporation of Delaware
No Drawing. Filed June 19, 1962, Ser. No. 203,488
12 Claims. (Cl. 260—671)

This invention relates to a process for preparing an alkyl aromatic.

Alkyl aromatics are prepared in accordance with the process of this invention by treating a water-saturated alkylatable aromatic compound with gaseous boron trifluoride and thereafter reacting the resulting alkylatable aromatic compound with an olefin in the presence of gaseous boron trifluoride.

Any alkylatable aromatic hydrocarbon can be employed in the reaction, whether it be solid or liquid, mononuclear, dinuclear or polynuclear, substituted or unsubstituted. Among the mononuclear aromatic hydrocarbons which are preferred are benzene and substituted benzenes containing as substituents from one to three alkyl radicals, each of said alkyl radicals having from one to 20 carbon atoms, preferably from one to 10 carbon atoms. Among the dinuclear alkylatable aromatic hydrocarbons which are preferred are naphthalene and substituted naphthalenes containing as substituents from one to four alkyl radicals, each of said alkyl radicals having from one to 20 carbon atoms, preferably from one to 10 carbon atoms. Examples of alkylatable aromatic compounds which can be employed are benzene, toluene, ethylbenzene, xylenes, tetralin, cumene, diisopropylbenzene, n-octylbenzene, 2-phenyl-4-ethyloctadecene, naphthalene, isopropylnaphthalenes, diisopropylnaphthalenes, 1-ethyl-6-isobutylnaphthalene, 1,2,4-triisopropylbenzene, phenanthrene, etc. In the event the alkylatable aromatic compound is normally liquid, no extraneous solvent need be employed in the reaction. With a normally solid alkylatable aromatic hydrocarbon an inert solvent such as heptane, octane, isooctane, hexane, etc. can be employed.

While olefins having from three and up to 30 carbon atoms can be employed in the alkylation reaction, olefins having from three to 20 carbon atoms are preferred. Examples of olefins which can be employed are propylene, isobutylene, butene-1, cis-butene-2, trans-butene-2, pentene-1, cyclopentene, cyclohexene, cycloheptene, 4-methylcyclooctene, 2-methylbutene-1, 2-methylbutene-2, 3-methylbutene-1, cis-pentene-2, trans-pentene-2, hexene-1, cis-hexene-2, trans-hexene-2, 5,6-dimethylheptene-1, tetrapropylene, pentadecene-1, 6-cyclohexyldodecene-1, 4-n-nonyldodecene-1, n-tetracosene-1, n-heptacosene-1, 13-cyclopentylpentacosene, etc. Neither the alkylatable aromatic compound nor the olefin need be pure but can be present in admixture with other hydrocarbon materials which are substantially inert under the reaction conditions.

The amount of olefin necessary for reaction with the alkylatable aromatic compound at any moment can of course be small. Thus, in cases wherein the olefin, for example propylene, is introduced continuously into a mixture of an alkylatable aromatic compound, for example benzene, and catalyst, the amount of olefin initially present, or present as such at any moment, is small. In the event large amounts of reactants are brought together at one the amount of olefin relative to alkylatable aromatic compound will of course be large. The molar ratio of alkylatable aromatic compound to olefin, in order to facilitate the alkylation reaction and inhibit the formation of polymer, must be about 1:1 to about 30:1, preferably about 2:1 to about 10:1.

The alkylation reaction of this invention is catalyzed by the presence in the reaction system of boron trifluoride and water. No alkylation of alkylatable aromatic hydrocarbon with an olefin will take place in the presence of water alone. Similarly no appreciable alkylation will take place in the presence of gaseous boron trifluoride alone. See page 203 of Boron Trifluoride and Its Derivatives, Booth and Martin, John Wiley and Sons, Inc. (1949). As set forth in copending application Serial No. 15,846, now United States Patent No. 3,046,315, filed March 18, 1960, the alkylatable aromatic hydrocarbon can be alkylated with a boron trifluoride-water complex having the following formula:

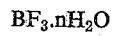

$$BF_3 \cdot nH_2O$$

wherein $n$ represents mols and has a value of about 0.5 to about 2.5, preferably about 1.2 to about 1.6. Unfortunately the amount of such catalyst employed in such case corresponds to about 0.5 to about 180 percent by weight relative to the amount of alkylatable aromatic compound initially present. The amount of alkylated aromatic compound obtained per pound of such catalyst is extremely small, about five to about 25 pounds per pound of catalyst. Since the boron trifluoride-water complex catalyst is generally discarded, the recovery and regeneration thereof being exceedingly difficult, its use as a catalyst in the alkylation reactions herein contemplated has been severely limited.

We have found that the amount of alkylated aromatic compound obtained per unit amount of boron trifluoride consumed can be appreciably increased over prior art methods by pretreatment of the alkylatable aromatic compound and by a discrete selection of water and boron trifluoride employed. In this procedure the alkylatable aromatic hydrocarbon must be one that is substantially saturated with water at atmospheric temperature and pressure. By "substantially saturated" we mean one that is associated with about 80 to about 100 percent by weight thereof of water at the defined temperature and pressure. In general, on a weight basis the water will be present in an amount corresponding to about 350 to about 550 parts per million relative to the alkylatable aromatic compound. Benzene, for example, when saturated will contain on a weight basis about 400 to about 500 parts per million of water. A water-saturated alkylatable aromatic compound can be obtained, for example, by mixing the same with a large excess of water at atmospheric temperature and pressure. After shaking the mixture the same is permitted to separate into two layers. The lower aqueous layer is removed from the upper layer by any conventional means, for example decantation. As a result of this the alkylatable aromatic compound remaining is saturated with water.

The alkylatable aromatic compound saturated with water is then treated with gaseous boron trifluoride in any suitable manner, for example by bubbling gaseous boron trifluoride therethrough at a pressure of about one atmosphere to about 1000 pounds per square inch gauge or higher, and a temperature of about 5° to about 50° C. Under these conditions the boron trifluoride will associate itself with the water in the alkylatable aromatic compound almost instantaneously. While we are not certain in what manner a physical and/or chemical association occurs between the boron trifluoride and water, we are of the opinion that a complex is formed in accordance with the definition given hereinabove. The amount of complex formed is of course small, but is molecularly dispersed throughout the alkylatable aromatic compound. The formation of the complex is complete when the amount of boron trifluoride gas introduced into the alkylatable aromatic compound is equivalent to the amount leaving the same. The amount of boron trifluoride gas so consumed is small and amounts to at least about 0.0006, but preferably about 0.0010 to about 0.0014 mol per mol of alkylatable aromatic compound.

The alkylatable aromatic compound so treated can be brought into contact with the alkylating olefin, and even though in association with the system there is a boron trifluoride-water complex, however small, dispersed throughout the alkylatable aromatic compound, no appreciable alkylation will occur. We have found, however, that alkylation can be made to occur if additionally there is present in the reaction system at least about 0.005 mol of gaseous boron trifluoride per mol of alkylatable aromatic compound, preferably about 0.008 to about 0.05 mol of boron trifluoride per mol of alkylatable aromatic compound.

The reaction conditions are not critical and fall within the scope of conditions normally employed in such reactions. Thus, the temperature can be from 0° C. to about 120° C., preferably from 15° C. to about 80° C., and more preferably from about 30° C. to about 60° C. Sufficient pressure is maintained on the system to maintain a substantial portion of the hydrocarbons charged in the liquid state. The process may be carried out at relatively low pressure, for example, from about 15 to 3000 pounds per square inch, preferably from about 45 to 1000 pounds per square inch and more preferably from about 75 to about 500 pounds per square inch.

The time required for completion of the alkylation reaction will depend to some extent upon the temperature employed but will generally be of the order of from about 0.25 hour to about four hours, preferably from about 0.5 hour to about three hours and more preferably from about one to two hours.

After the reaction has been completed two phases are present, an upper gaseous phase and a lower liquid phase. The two phases may be separated by any convenient method, preferably by bleeding the gaseous products from the reactor, and thereafter recovering the gaseous boron trifluoride. The liquid phase can thereafter be washed with an aqueous solution to remove catalyst or other water-soluble compounds therefrom and subsequently dried in any convenient method, for example, by contacting the same with sodium hydroxide pellets. The remainder of the liquid phase can be separated into its individual components by fractional distillation or any other suitable means.

We have stated above that the water-saturated alkylatable aromatic compound is first treated with boron trifluoride gas in order to form the boron trifluoride-water complex and then the system so produced is subjected to the influence of additional gaseous boron trifluoride in the presence of the olefin to obtain an alkylated aromatic. If desired boron trifluoride gas sufficient to associate itself with the water in the alkylatable aromatic compound and to remain as such in the reaction system can be added to the reaction system at the same time the alkylating olefin is added thereto, and the alkylation reaction of this invention will proceed satisfactorily.

The advantage of operation in accordance with the process defined herein is obvious. In alkylations of this type the boron trifluoride-water complex is lost, and therefore when such complex is the sole catalyst and large amounts thereof are employed, the amount of alkylated aromatic obtained per unit amount of catalyst as noted is small. In the present process only a very small amount of boron trifluoride-water complex is employed, and therefore only a small amount of the same is lost. The gaseous boron-trifluoride can easily be recovered. The amount of alkylated aromatic compound obtained per unit amount of boron trifluoride which is consumed or lost is extremely large. Thus we have obtained as high as 4500 pounds of alkylated aromatic per pound of boron trifluoride consumed or lost.

The invention can further be illustrated by reference to the following examples.

EXAMPLE I

Into a two-liter stirred autoclave there was placed 390.6 grams of reagent-type benzene containing on a weight basis 100 parts per million of water. The autoclave was closed and a cylinder containing boron trifluoride gas was attached thereto. There was then introduced into the autoclave 101 grams of boron trifluoride gas from the cylinder. It was calculated that about 0.146 gram of the boron trifluoride could react with the water in the benzene and the rest would remain as gaseous boron trifluoride. The autoclave was then pressured with nitrogen to 325 pounds per square inch gauge and the temperature thereof was thereafter maintained at 45° C. Propylene was then introduced into the autoclave over a one-hour period until the final amount introduced amounted to 84.16 grams (two mols). The reaction product was removed from the autoclave, the unreacted boron trifluoride gas vented therefrom, and the remainder was water washed and then dried over sodium hydroxide pellets. The product remaining was analyzed by infrared techniques and the yield of cumene, based on propylene, was found to be 52.9 mol percent.

EXAMPLE II

This run was identical to that of Example I except that the same amount of water-saturated benzene was employed and 88 grams of boron trifluoride gas was introduced into the autoclave. To obtain the water-saturated benzene, benzene similar to that of Example I was mixed, at room temperature and pressure, with an equal weight of water. The benzene and water were vigorously stirred over a period of five minutes and then permitted to separate. The aqueous layer was drained off, leaving the water-saturated benzene. Benzene similarly prepared in the past always analyzed 420±50 parts per million of water. It was calculated that 0.68 gram of boron trifluoride could react with the benzene and the remainder would remain as gaseous boron trifluoride. The yield of cumene, based on propylene, was found to be 68.8 mol percent.

The results obtained above are striking. In Example I, far less than the amount of water required to saturate the benzene was present, and yet the yield of cumene was 52.9 mol percent. Correspondingly lower yields of cumene would be obtained with lesser amounts of water in the benzene. In fact with no water in the benzene, under otherwise identical conditions, the run would have resulted in little or no cumene production. The addition of only enough water to the benzene sufficient to saturate the same in Example II resulted in a substantial increase in the amount of cumene obtained. In both runs the boron trifluoride gas was recovered.

That gaseous boron trifluoride must also be present in the reaction zone in addition to the small amount of boron trifluoride-water complex is apparent from the following.

EXAMPLE III

Through 1000 grams of water-saturated benzene containing 460 parts per million of water there was bubbled, at atmospheric temperature and pressure and over a one-half hour period, 3.8 grams per minute of boron trifluoride. Of this, 1.7 grams of boron trifluoride were absorbed by the benzene. The benzene so prepared was introduced at a rate of 162.4 cubic centimeters per minute into a 300 milliliter continuous stirred-flow autoclave. At the same time propylene which had been at room temperature and a pressure of 170 pounds per square inch gauge was also introduced into the autoclave at a rate of 73.6 cc. per minute. The autoclave was maintained at a pressure of 500 pounds per square inch gauge and a temperature of 40° C. At the end of 1½ hours there was no production of cumene.

EXAMPLE IV

This run was identical to that of Example III, except that there was additionally added to the autoclave boron trifluoride gas at a rate of 118 grams per hour (calculated at atmospheric temperature and pressure). The addition was continued until the reaction reached equilibrium. The product was then analyzed and found to contain 55.4 mol percent cumene based on the propylene. The gaseous boron trifluoride was recovered.

The large amounts of cumene obtained in accordance with the process of this invention per pound of boron trifluoride employed can be seen from the following.

EXAMPLE V

Two additional runs were made in a two-liter stainless steel autoclave in a manner similar to Example II using water saturated benzene. The results obtained are tabulated below in Table I.

*Table I*

| Run No. | 1 | 2 |
|---|---|---|
| Conditions: | | |
| Benzene containing 460 p.p.m. of water, mols | 4.95 | 4.95 |
| Propylene, mols | 1.96 | 1.96 |
| Boron trifluoride, mols | 0.04 | 0.21 |
| Benzene/boron trifluoride, mol ratio | 124:1 | 24:1 |
| Time, hours | 2.6 | 2.25 |
| Temperature, °C | 45.0 | 45.0 |
| Pressure, pounds per square inch gauge | 100–300 | 100–300 |
| Recovered: | | |
| Cumene, grams | 145.2 | 101 |
| Cumene, mol percent | 68.2 | 57.0 |
| Boron trifluoride, percent by weight | 98.0 | 99.0 |
| Calculated pounds of cumene obtained per pound of boron trifluoride lost | 3,000 | 1,100 |

The data in Table I strikingly show the effectiveness of the process of this invention. The data additionally show that in order to obtain optimum results the amount of boron trifluoride gas employed must be maintained within closely-defined limits. The catalyst efficiency in Run No. 2 was good but not as good as Run No. 1 wherein a smaller amount of boron trifluoride gas was employed.

Obviously many modifications and variations of the invention as hereinabove set forth, can be made without departing from the spirit and scope thereof, and therefore only such limitations should be imposed as are indicated in the appended claims.

We claim:

1. A process for alkylating an alkylatable aromatic which comprises reacting a substantially water-saturated alkylatable aromatic, calculated at atmospheric temperature and pressure, containing boron trifluoride in the presence of gaseous boron trifluoride and an olefin.

2. A process for alkylating an alkylatable aromatic which comprises reacting a substantially water-saturated alkylatable aromatic, calculated at atmospheric temperature and pressure, containing at least about 0.0006 mol of boron trifluoride per mol of said alkylatable aromatic in the presence of at least about 0.005 mol of gaseous boron trifluoride per mol of said alkylatable aromatic and an olefin.

3. A process for alkylating an alkylatable aromatic which comprises reacting a substantially water-saturated alkylatable aromatic, calculated at atmospheric temperature and pressure, with gaseous boron trifluoride and thereafter reacting the resulting alkylatable aromatic with an olefin in the presence of gaseous boron trifluoride.

4. A process for alkylating an alkylatable aromatic which comprises reacting a substantially water-saturated alkylatable aromatic, calculated at atmospheric temperature and pressure, with at least about 0.0006 mol of gaseous boron trifluoride and thereafter reacting the resulting alkylatable aromatic with an olefin in the presence of at least about 0.005 mol of gaseous boron trifluoride per mol of said alkylatable aromatic.

5. A process for alkylating benzene which comprises reacting a substantially water-saturated benzene, calculated at atmospheric temperature and pressure, containing boron trifluoride in the presence of gaseous boron trifluoride and an olefin.

6. A process for alkylating benzene which comprises reacting a substantially water-saturated benzene, calculated at atmospheric temperature and pressure, containing at least about 0.0006 mol of boron trifluoride per mol of said benzene in the presence of at least about 0.005 mol of gaseous boron trifluoride per mol of said benzene and an olefin.

7. A process for alkylating benzene which comprises reacting a substantially water-saturated benzene, calculated at atmospheric temperature and pressure, with gaseous boron trifluoride and thereafter reacting the resulting benzene with an olefin in the presence of gaseous boron trifluoride.

8. A process for alkylating benzene which comprises reacting a substantially water-saturated benzene, calculated at atmospheric temperature and pressure, with at least about 0.0006 mol of gaseous boron trifluoride and thereafter reacting the resulting benzene with an olefin in the presence of at least about 0.005 mol of gaseous boron trifluoride per mol of said benzene.

9. A process for alkylating benzene which comprises reacting a substantially water-saturated benzene, calculated at atmospheric temperature and pressure, containing boron trifluoride in the presence of gaseous boron trifluoride and propylene.

10. A process for alkylating benzene which comprises reacting a substantially water-saturated benzene, calculated at atmospheric temperature and pressure, containing at least about 0.0006 mol of boron trifluoride per mol of said benzene in the presence of at least about 0.005 mol of gaseous boron trifluoride per mol of said benzene and propylene.

11. A process for alkylating benzene which comprises reacting a substantially water-saturated benzene, calculated at atmospheric temperature and pressure, with gaseous boron trifluoride and thereafter reacting the resulting benzene with propylene in the presence of gaseous boron trifluoride.

12. A process for alkylating benzene which comprises reacting a substantially water-saturated benzene, calculated at atmospheric temperature and pressure, with at least about 0.0006 mol of gaseous boron trifluoride and thereafter reacting the resulting benzene with propylene in the presence of at least about 0.005 mol of gaseous boron trifluoride per mol of said benzene.

References Cited by the Examiner

UNITED STATES PATENTS

| | | | |
|---|---|---|---|
| 2,376,119 | 5/45 | Bruner et al. | 260—671 |
| 2,403,963 | 7/46 | Axe | 260—671 |
| 2,404,120 | 7/46 | Axe | 260—671 |
| 3,046,315 | 7/62 | Dimond | 260—671 |

ALPHONSO D. SULLIVAN, *Primary Examiner.*

PAUL M. COUGHLIN, JR., *Examiner.*